(12) United States Patent
Guntoro et al.

(10) Patent No.: US 11,360,443 B2
(45) Date of Patent: Jun. 14, 2022

(54) MODEL CALCULATION UNIT AND CONTROL UNIT FOR CALCULATING A PARTIAL DERIVATIVE OF AN RBF MODEL

(71) Applicant: Robert Bosch GmbH, Stuttgart (DE)

(72) Inventors: Andre Guntoro, Weil der Stadt (DE);
Heiner Markert, Stuttgart (DE);
Martin Schiegg, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 446 days.

(21) Appl. No.: 16/329,922

(22) PCT Filed: Sep. 4, 2017

(86) PCT No.: PCT/EP2017/072061
§ 371 (c)(1),
(2) Date: Mar. 1, 2019

(87) PCT Pub. No.: WO2018/046427
PCT Pub. Date: Mar. 15, 2018

(65) Prior Publication Data
US 2021/0286327 A1    Sep. 16, 2021

(30) Foreign Application Priority Data

Sep. 7, 2016 (DE) ................ 10 2016 216 954.8

(51) Int. Cl.
*G05B 13/04* (2006.01)
*G06F 7/544* (2006.01)
(Continued)

(52) U.S. Cl.
CPC .......... *G05B 13/04* (2013.01); *G06F 7/5443* (2013.01); *F02D 41/1405* (2013.01); *F02D 2041/1433* (2013.01); *G05B 13/027* (2013.01)

(58) Field of Classification Search
None
See application file for complete search history.

(56) References Cited

U.S. PATENT DOCUMENTS

| | | | | |
|---|---|---|---|---|
| 2006/0013475 | A1* | 1/2006 | Philomin | G06K 9/6273 382/156 |
| 2007/0022068 | A1* | 1/2007 | Linsker | G05B 13/026 706/23 |
| 2007/0203616 | A1* | 8/2007 | Borrmann | F02D 41/1405 701/1 |

FOREIGN PATENT DOCUMENTS

| | | |
|---|---|---|
| DE | 10049486 A1 | 4/2002 |
| WO | 1996006400 A1 | 2/1996 |

OTHER PUBLICATIONS

Saraf et al., "GMM-Guided Gradient Descent Learning of RBF Neural Network with Its Application on Robust GPS Satellites Selection", 2011, 2011 1st International eConference on Computer and Knowledge Engineering, pp. 139-143 (Year: 2011).*

(Continued)

*Primary Examiner* — Mohammad Ali
*Assistant Examiner* — David Earl Ogg
(74) *Attorney, Agent, or Firm* — Norton Rose Fulbright US LLP; Gerard Messina

(57) ABSTRACT

A model calculation unit for calculating a gradient with respect to a certain input variable of input variables of a predefined input variable vector for an RBF model with the aid of a hard-wired processor core designed as hardware for calculating a fixedly predefined processing algorithm in coupled functional blocks, the processor core being designed to calculate the gradient with respect to the certain input variable for an RBF model as a function of one or multiple input variable(s) of the input variable vector of an input dimension, of a number of nodes, of length scales (Continued)

predefined for each node and each input dimension, and of parameters of the RBF function predefined for each node.

9 Claims, 2 Drawing Sheets

(51) Int. Cl.
    *F02D 41/14*     (2006.01)
    *G05B 13/02*     (2006.01)

(56) References Cited

OTHER PUBLICATIONS

Xiaofang et al., "RBF Networks-Based Adaptive Approximate Model Controller for Steam Valving Control", 2011, Neural Computing and Applications vol. 20 MO. 4, pp. 549-556 (Year: 2011).*
Thanh et al., "Digital Hardware Implementation of a Radial Basis Function Neural Network", 2015, Computers & Electrical Engineering vol. 53, pp. 106-121 (Year: 2015).*
De Souza et al., "Proposal for Parallel Fixed Point Implementation of a Radial Basis Function Network in an FPGA", 2014, IEEE, pp. 2-4 (Year: 2014).*
International Search Report for PCT/EP2017/072061, dated Dec. 6, 2017.
Thanh Nguyen Phan et al., "Digital Hardware Implementation of a Radial Basis Function Neural Network", Computers & Electrical Engineering, Pergamon Press, GB, vol. 53, 2015, pp. 106-121, XP029760636.
De Souza Alisson C D et al., "Proposal for Parallel Fixed Point Implementation of a Radial Basis Function Network in an FPGA", IX Southern Conference on Programmable Logic (SPL), 2014, pp. 1-6, XP032716798.
Eppler W et al., "High Speed Neural Network Chip for Trigger Purposes in High Energy Physics", Design, Automation and Test in Europe, Proceedings Paris, France, Los Alamitos, CA, USA, Comput. Soc, 1998, pp. 108-115, XP010268412.
Richard Fiifi Turkson et al., "Artificial Neural Network Applications in the Calibration of Spark-Ignition Engines: An Overview", Engineering Science and Technology, An International Journal, vol. 19, No. 3, 2016, pp. 1346-1359, XP055420859.
Xiaofang Yuan et al., "RBF Networks-Based Adaptive Approximate Model Controller for Steam Valving Control", Neural Computing and Applications, Springer-Verlag, Lo, vol. 20, No. 4, 2011, pp. 549-556, XP019900121.

* cited by examiner

MODEL CALCULATION UNIT AND CONTROL UNIT FOR CALCULATING A PARTIAL DERIVATIVE OF AN RBF MODEL

FIELD

The present invention relates to the calculation of functional models in a separate hard-wired model calculation unit, in particular for calculating radial basis function (RBF) models.

BACKGROUND INFORMATION

Functions of controllers of technical systems, such as internal combustion engines, electric drives, battery stores and the like, are frequently implemented using models which represent a mathematical image of the real system. In the case of physical models, in particular with complex relationships, however, the necessary calculation accuracy is lacking, and given today's computing capacities, it is generally difficult to calculate such models within the real time requirements necessary for a control unit. For such cases, it is envisaged to utilize data-based models which exclusively describe relationships between an output variable and input variables based on training data obtained with the aid of a test bench or the like. In particular, data-based models are suitable for modeling complex relationships in which multiple input variables, between which interdependencies exist, are taken into consideration in the model in a suitable manner. Moreover, the modeling with the aid of data-based models offers the option of supplementing the model by adding individual input variables.

Data-based functional models are generally based on a large number of nodes to achieve sufficient modeling accuracy for the particular application. Given the high number of nodes, a high computing capacity is required for calculating a model value with the aid of a data-based functional model, such as a Gaussian process model. To be able to calculate such a data-based functional model in real time in a control unit application, model calculation units based on a hardware design may thus be provided.

SUMMARY

According to the present invention, a model calculation unit for calculating an RBF model, a control unit, and a use of the control unit are provided.

Further embodiments of the present invention are described herein.

The above model calculation unit provides one embodiment which makes it possible to calculate an RBF model.

According to a first aspect of the present invention, a model calculation unit for calculating a gradient with respect to at least one of the input variables of an input variable vector of an RBF model with the aid of a hard-wired processor core designed as hardware for the calculation of a fixedly predefined processing algorithm in coupled functional blocks is provided, the processor core being designed to calculate the gradient with respect to the input variable for an RBF model as a function of one or multiple input variable(s) of the input variable vector of an input dimension, a number of nodes, length scales predefined for each node and each input dimension, and of parameters of the RBF function predefined for each node, the following being calculated:

a first term which, for the certain input variable, indicates a difference between a value of a node corresponding to the certain input variable and the certain input variable; and a second term which, for a node, indicates a result of an exponential function which is multiplied with a parameter of the RBF function assigned to the node, the argument of the exponential function corresponding to a negative sum of products, ascertained across all input dimensions, of the respective assigned length scale and the squared difference between the value of an node corresponding to the respective input dimension and the input variable corresponding to the input dimension, a sum of the product of the first term, the second term and the respective assigned length scale being formed across all nodes to obtain a value proportional to the gradient.

One aspect of the above model calculation unit is to design it for calculating an RBF model in hardware structures separately in a processor core in a control unit. In this way, an essentially hard-wired hardware circuit may be provided for the implementation of functions, which makes it possible to calculate an RBF model while causing only a very low processing load in a software-controlled microprocessor of a control unit in the process. As a result of the hardware acceleration provided by the model calculation unit, the RBF model may also be calculated in real time, so that the use of such a model becomes of interest for control unit applications for internal combustion engines in motor vehicles.

Moreover, the use of RBF models may enable a data-based modeling using a lower number of nodes than with comparable data-based models, such as a Gaussian process model, without reducing the accuracy.

Some applications in control units require the calculation of a partial derivative, i.e., of a gradient of the model value of the RBF model with respect to an input variable. This may, in particular, be the case when the next sampling point depends on the result of the gradient of the previous sampling point. The calculation of the gradient is, in general, very time-consuming.

The above model calculation unit provides a calculation path designed as hardware which, in addition to the calculation of a model value of the RBF model, also determines gradients at the sampling point. This is possible in that the second term, which is required anyhow for the calculation of the function value of the RBF model at the predefined input variable vector, which corresponds to a sampling point, may also be used for the calculation of the gradient.

Furthermore, the processor core may include a state machine, a memory for storing the one or multiple input variable(s) of the input variable vector, the nodes, the length scales, the parameters predefined for each node and the output variable, one or multiple processing operation blocks, in particular a MAC block and an exponential function calculation block.

According to one specific embodiment of the present invention, the processor core may be formed in a surface area of an integrated module.

Furthermore, the calculation of the gradient may be activated or deactivated by predefining a selection variable.

According to one further aspect of the present invention, a control unit including a microprocessor and the above model calculation unit is provided. In particular, the control unit may be designed as an integrated circuit.

According to one further aspect of the present invention, a use of the above control unit as a control unit for controlling an engine system in a motor vehicle is provided.

BRIEF DESCRIPTION OF THE DRAWINGS

Specific embodiments of the present invention are described in greater detail hereafter based on the figures.

DETAILED DESCRIPTION OF EXAMPLE EMBODIMENTS

Figure 1:
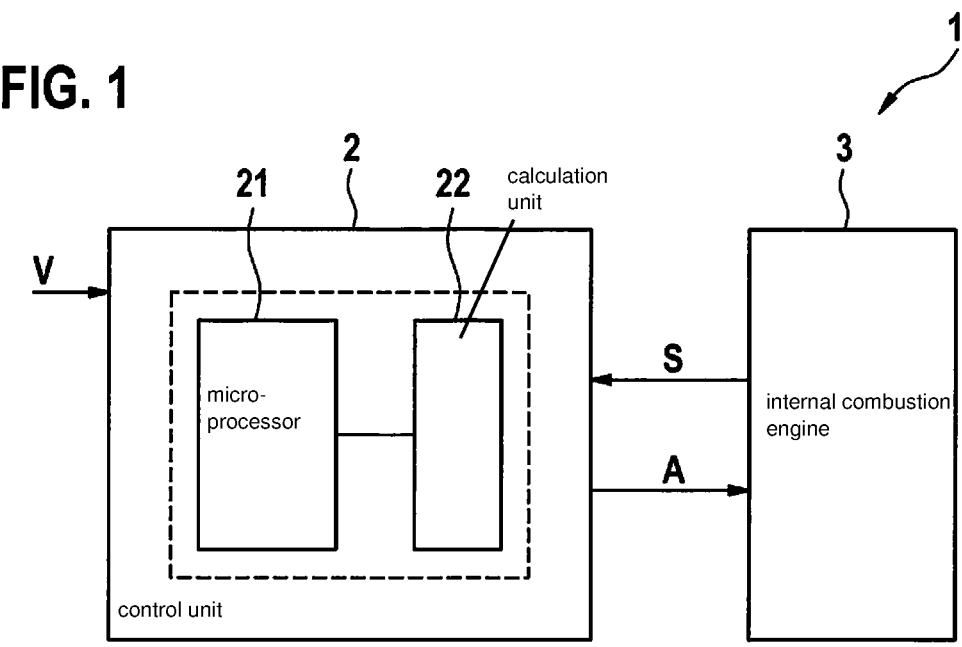
FIG. 1 shows a schematic representation of a control unit for use for an engine system in a motor vehicle.

FIG. 1, by way of example, shows a schematic representation of a control unit 2 for an engine system 1 including an internal combustion engine 3 as a technical system to be controlled. Control unit 2 includes a microprocessor 21 and a model calculation unit 22, which may be designed as separate components or in an integrated manner in separate surface areas on a chip. In particular, model calculation unit 22 represents a hardware circuit, which may be structurally separated from a processor core of microprocessor 21.

Model calculation unit 22 is essentially hard-wired and accordingly not designed like microprocessor 21 to execute software code and thereby execute a variable function predefined by software. In other words, no processor is provided in model calculation unit 22 so that it is not operable by software code.

By focusing on a predefined model function, a resource-optimized implementation of such a model calculation unit 22 is made possible. In an integrated design, model calculation unit 22 may be implemented in a surface area-optimized manner, which additionally makes fast calculations possible.

Control unit 2 is essentially used to process sensor signals S or sensor variables detected by a sensor system in internal combustion engine 3 and/or external specifications V and to apply values of one or multiple corresponding activation variable(s) A to internal combustion engine 3 cyclically at fixedly predefined time intervals of, e.g., 1 to 100 ms or with angular synchronism as a function of a crankshaft angle of an operated internal combustion engine, so that the internal combustion engine is operable in a manner known per se.

Figure 2:
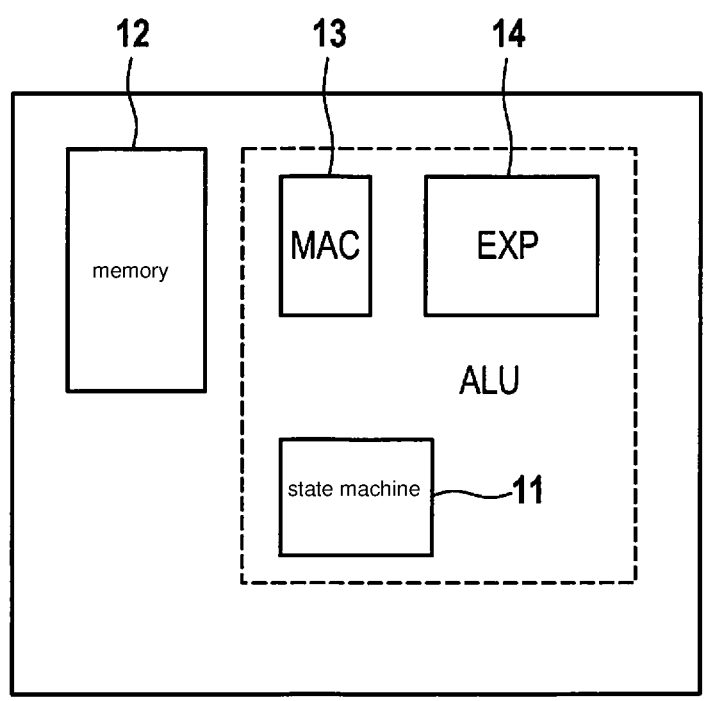
FIG. 2 shows a schematic representation of a calculation unit as part of the control unit.

FIG. 2 shows a model calculation unit 22 in greater detail. Model calculation unit 22 includes a state machine 11, a memory 12 and one or multiple operation block(s), which include, for example, one or multiple MAC block(s) 13 (MAC: multiply-accumulate for fixed-point or floating-point calculations) and an exponential function calculation block (EXP) 14 for calculating an exponential function. State machine 11 and the one or multiple operation block(s) 13, 14 form a processor core ALU of model calculation unit 22. In addition or as an alternative to the MAC block, the operation block may include a multiplication block and an addition block.

With the aid of state machine 11, values of input variables stored in an input variable memory area of memory 12 may be calculated by repeated loop calculations to obtain intermediate variables or output variables, which are written into a corresponding output variable memory area of memory 12.

State machine 11 is designed to calculate an RBF model. State machine 11 may be described based on the following pseudo code:

```
/* Input transformation */
for (k=0; k<p7; k++) {
ut[k] = u[k] * p1[k] + p2[k];
}
/* Loop calculation */
for (j=p8; j<p6; j++) {
i = j * p7;
t = 0;
for (k=0; k<p7; k++) {
d = V[i+k] − ut[k];
t += L[i+k] * d * d;
}
y[0] += p3[j] * exp(−t);
}
/* Output transformation */
z[0] = y[0] * p4[0] + p5[0];
``` where p7: maximum index value for the input variables of the input variable vector, indicates the dimension of the input variable vector p8: minimum index value (normally zero, except in the case of interruption and continuation of the calculation)

p6: maximum index value (number of nodes)

p3: parameter of the RBF model u: input variables ut: transformed input variables L: local length scales V: training points or nodes p1, p2: variables for the input transformation for each of the input variables of the input variable vector p4, p5: variables for the output transformation with dimension 1 (singleton)

With the aid of the above pseudo code, the following calculation for the RBF model may be carried out:

$$z_0 = p_5 + p_4 \cdot \sum_{j=0}^{p_6-1} p_{3,j} \cdot \exp\left(-\sum_{k=0}^{p_7-1} l_{j,k} \cdot (V_{j,k} - (p_{1,k} \cdot u_k + p_{2,k}))^2\right)$$

Figure 3:
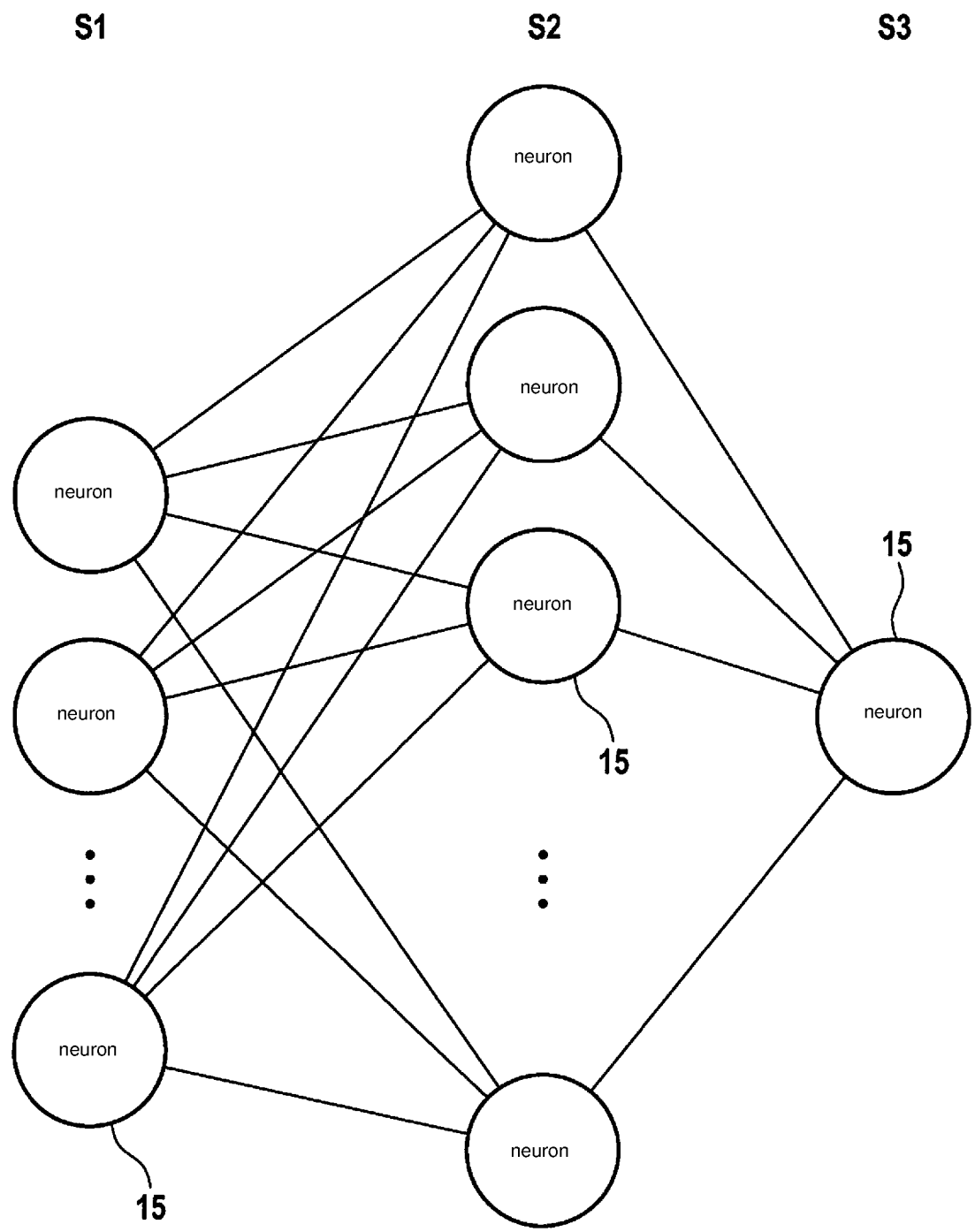
FIG. 3 shows a schematic representation of a neuron configuration of an RBF model.

As is graphically represented in FIG. 3, the RBF function essentially corresponds to a special form of a neural network including three layers, i.e., an input layer S1 including p7 neurons 15 for an input variable vector including p7 input variables, an intermediate layer S2 including a number of p6 neurons 15, with a radial square function as the activation function, and an output layer S3 including a neuron 15 and with a linear activation function.

It is possible to carry out an input and/or output transformation of the input variables of the input variable vector or of the output variables of the output variable vector with the aid of the standardization variables p1 and p2 predefined for each element of the input variable vector, or for output variables p4 and p5.

The calculation of the RBF model allows a lean design of model calculation unit 22, so that its space requirement is low in an integrated design.

To determine a gradient at the sampling point, the model calculation unit can be modified according to the following pseudocode:

```
/* Input transformation */
for (k=0; k<p7; k++) {
ut[k] = u[k] * p1[k] + p2[k];
}
/* Loop calculation */
for (j=p8; j<p6; j++) {
i = j * p7;
t = 0.0f;
for (k=0; k<p7; k++) {
d = V[i+k] – ut[k];
gd = d * L[i+k];
t += gd * d;
if (cfg_pd) g[k] = gd;
}
e = exp(-t);
yj = p3[j] * e;
y[0] += yj; // RBF model
if (cfg_pd) {
for (n=1, k=p10; n<p9; n++, k++) {
y[n] += g[k] * yj; // gradient of the RBF model
}
}
}
/* Output transformation */
for (k=0; k<p9; k++) {
z[k] = y[k] * p4[k] + p5[k];
}
``` where
p9: number of the gradient values, including the base result of the RBF model, z[0] corresponding to the model value of the base model and z[1 . . . p9-1] corresponding to the gradient values with respect to the selected input variables
p10: initial index of the input variable for the gradient values The above pseudocode may be rewritten into the following calculations, which determine the output variables and the gradient:

Based on the above calculation formula (including input and output transformations)

$$z_0 = p_5 + p_4 \cdot \sum_{j=0}^{p_6-1} p_{3,j} \cdot \exp\left(-\underbrace{\sum_{k=0}^{p_7-1} l_{j,k} \cdot \underbrace{(V_{j,k} - (p_{1,k} \cdot u_k + p_{2,k}))^2}_{=\delta_{j,k}}}_{=y_j}\right) =$$

$$p_5 + p_4 \cdot \sum_{j=0}^{p_6-1} y_j$$

this is used to calculate the gradient for $u_d$ $$\frac{\partial z}{\partial u_d} = 2 \cdot p_{1,d} \cdot p_4 \cdot \sum_{j=0}^{p_6-1} y_j \cdot \underbrace{l_{j,d} \cdot \delta_{j,d}}_{=g_{j,d}}$$

where $$l_{j,k} = \frac{1}{2\sigma_{j,k}^2}$$

of half the reciprocal value corresponds to the squared length scales.

Here, p4 and p5 are not singletons, but:
p5[k]=0 for k=1 . . . p9-1;
p4[k]=2.0*p1[k]*p4[0] for k=1 . . . p9-1 and serves as a factor for the gradient calculation (see above formula $$\frac{\partial z}{\partial u_d} \sim 2 \cdot p_{1,d} \cdot p_4).$$

The index d corresponds to the input variable of the input variable vector with respect to which the gradient is determined.

The above pseudocode thus carries out the following calculating steps, which enable both the calculation of the RBF model and the calculation of the gradient for the input variable having index d:

$$\underbrace{\underbrace{2 \cdot p_{1,d} \cdot p_4 \cdot \underbrace{\sum_{j=0}^{p_6-1} p_{3,j} \cdot \exp\left(-\sum_{k=0}^{p_7-1} g_{j,k} \cdot \delta_{j,k}\right)}_{=y_j} \cdot g_{j,d}}_{=z-p_5}}_{=\frac{\partial z}{\partial u_d}}$$

The gradient calculation is activated by variable cfg_pd and started with respect to the initial index of the input variable defined by p10.

What is claimed is:
1. A model calculation unit for calculating a gradient with respect to a certain input variable of input variables of a predefined input variable vector of a radial basis function (RBF) model with the aid of a hard-wired processor core designed as hardware for calculating a fixedly predefined processing algorithm in coupled function blocks, the model calculation unit comprising:
the processor core configured to calculate the gradient with respect to the certain input variable for the RBF model as a function of multiple input variables of the input variable vector of an input dimension greater than 1, of a number of nodes, of respective length scales predefined for each node and each input dimension, and of parameters of the RBF function predefined for each node, the processor core configured to:
calculate a first term which, for the certain input variable, indicates a difference between: (i) a value of a first node of the nodes, the first node corresponding to the certain input variable, and (ii) the certain input variable; and
calculate a second term which, for a second node of the nodes, indicates a result of an exponential function multiplied with a parameter of the RBF function predefined for the second node, wherein an argument of the exponential function corresponds to a negative of a sum of products, the products being ascertained for all input dimensions, wherein each product for each respective input dimension of the input variable vector being determined by multiplying together the respective length scale predefined for the respective input dimension and a squared difference between: (i) a value of a respective third node of the nodes corresponding to the respective input dimension, and (ii) an input variable of the multiple input variables which corresponds to the respective input dimension;
wherein a value proportional to the gradient is obtained based on a sum of second products, the second products being ascertained for all of the nodes, each second product for each node of the nodes being determined by multiplying together the first term, the second term, and the respective predefined length scale for the node.

2. The model calculation unit as recited in claim 1, wherein the processor core is configured to calculate the gradient by multiplying the value proportional to the gradient by a multiplication product of: (i) 2, (ii) a value of a predefined input transformation variable which is assigned to the certain input variable, and (iii) a predefined output transformation variable.

3. The model calculation unit as recited in claim 1, wherein the processor core is configured to calculate also the output variable of the RBF model on an input variable vector including the certain input variable, in addition to the gradient.

4. The model calculation unit as recited in claim 1, wherein the processor core includes a state machine and one or multiple processing operation blocks, the one or multiple operating blocks including a multiply-accumulate (MAC) block and an exponential function calculation block, and a memory for storing the one or multiple input variable(s) of the input variable vector, the nodes, the length scales, the parameters predefined for each node and the output variable.

5. The model calculation unit as recited in claim 1, wherein the calculation of the gradient is activated or deactivated by predefining a selection variable.

6. A control unit, comprising:
a microprocessor; and
at least one model calculation unit for calculating a gradient with respect to a certain input variable of input variables of a predefined input variable vector of a radial basis function (RBF) model with the aid of a hard-wired processor core designed as hardware for calculating a fixedly predefined processing algorithm in coupled function blocks, the model calculation unit comprising:
the processor core configured to calculate the gradient with respect to the certain input variable for the RBF model as a function of multiple input variables of the input variable vector of an input dimension greater than 1, of a number of nodes, of respective length scales predefined for each node and each input dimension, and of parameters of the RBF function predefined for each node, the processor core configured to:
calculate a first term which, for the certain input variable, indicates a difference between: (i) a value of a first node of the nodes, the first node corresponding to the certain input variable, and (ii) the certain input variable; and
calculate a second term which, for a second node of the nodes, indicates a result of an exponential function which is multiplied with a parameter of the RBF function predefined for the second node, wherein an argument of the exponential function corresponds to a negative sum of products, the products being ascertained for all input dimensions, wherein each product for each respective input dimension of the input variable vector being determined by multiplying together the respective length scale predefined for the respective input dimension and a squared difference between (i) a value of a respective third node of the nodes corresponding to the respective input dimension, and (ii) an input variable of the multiple input variables corresponding to the respective input dimension;
wherein a value proportional to the gradient is obtained based on a sum of second products, the second products being ascertained for all of the nodes, each second product for each node of the nodes being determined by multiplying together the first term, the second term, and the respective predefined length scale for the node.

7. The control unit as recited in claim 6, wherein the control unit is an integrated circuit.

8. A method of using a control unit, comprising:
providing a control unit, the control unit including a microprocessor, and at least one model calculation unit for calculating a gradient with respect to a certain input variable of input variables of a predefined input variable vector of a radial basis function (RBF) model with the aid of a hard-wired processor core designed as hardware for calculating a fixedly predefined processing algorithm in coupled function blocks, the model calculation unit comprising:
the processor core configured to calculate the gradient with respect to the certain input variable for the RBF model as a function of multiple input variables of the input variable vector of an input dimension greater than 1, of a number of nodes, of respective length scales predefined for each node and each input dimension, and of parameters of the RBF function predefined for each node, the processor core configured to:
calculate a first term which, for the certain input variable, indicates a difference between: (i) a value of a first node of the nodes, the first node corresponding to the certain input variable, and (ii) the certain input variable; and
calculate a second term which, for a second node of the nodes, indicates a result of an exponential function multiplied with a parameter of the RBF function predefined for the second node, wherein an argument of the exponential function corresponds to a negative sum of products, the products being ascertained for all input dimensions, wherein each product for each respective dimension of the input variable vector being determined by multiplying together of the respective length scale predefined for the respective input dimension and a squared difference between: (i) a value of a respective third node of the nodes corresponding to the respective input dimension, and (ii) an input variable of the multiple input variables which corresponds to the respective input dimension;
wherein a value proportional to the gradient is obtained based on a sum of second products, the second products being ascertained for all of the nodes, each second product for each node of the nodes being determined by multiplying together the first term, the second term, and the respective predefined length scale for the node; and
controlling an engine system in a motor vehicle using the control unit.

9. The model calculation unit as recited in claim 1, wherein the model calculation unit is not operable by software code.

* * * * *